INVENTORS.
JOSEPH G. SELMECZI
EARL C. DREWS
BY
Brown, Critchlow, Flick & Peckham
ATTORNEYS.

Sept. 19, 1967 J. G. SELMECZI ET AL 3,342,338
WATER TREATING APPARATUS WITH AGENT-ADDING DISPENSER
Filed June 6, 1966 2 Sheets-Sheet 2
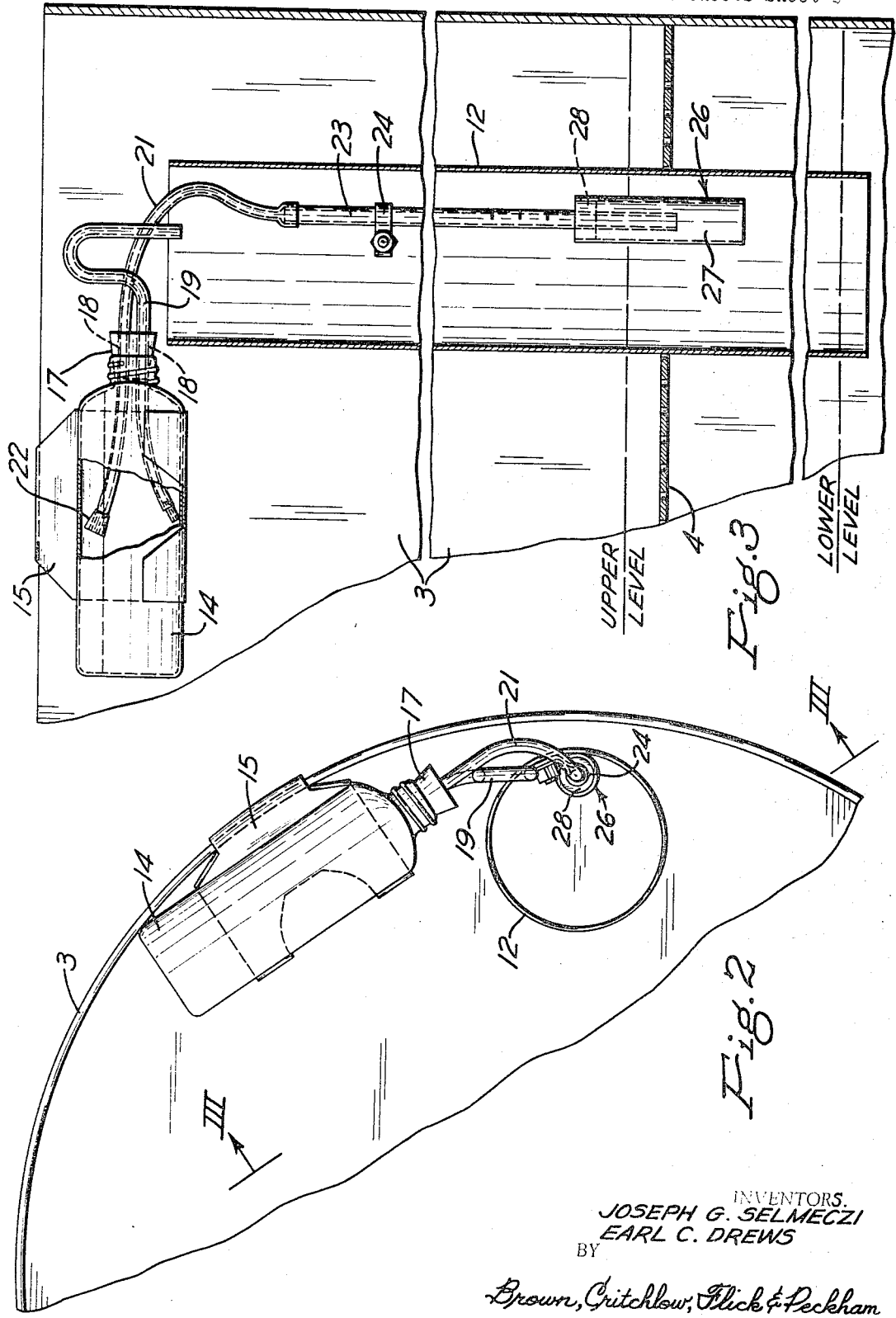
INVENTORS.
JOSEPH G. SELMECZI
EARL C. DREWS
BY
Brown, Critchlow, Flick & Peckham
ATTORNEYS.

United States Patent Office 3,342,338
Patented Sept. 19, 1967

3,342,338
WATER TREATING APPARATUS WITH AGENT-ADDING DISPENSER
Joseph G. Selmeczi, Bridgeville, Pa., and Earl C. Drews, Liberty, Mo., assignors to General Ionics Corporation, Bridgeville, Pa., a corporation of Pennsylvania
Filed June 6, 1966, Ser. No. 555,330
3 Claims. (Cl. 210—191)

ABSTRACT OF THE DISCLOSURE

An agent-adding dispenser for water treating apparatus is mounted in the upper part of a brine tank and is provided with a discharge tube and an air inlet tube. A vertical standpipe mounted in the tank has its open end connected to the air tube and its lower end connected to a downwardly opening sleeve slidably mounted on it. The lower ends of the sleeve and standpipe are located between the upper and lower levels of the brine in the tank so that water rising in the sleeve to replace withdrawn brine will force air into the dispenser in order to force liquid agent out of the discharge tube and into the tank.

---

Figure 1:
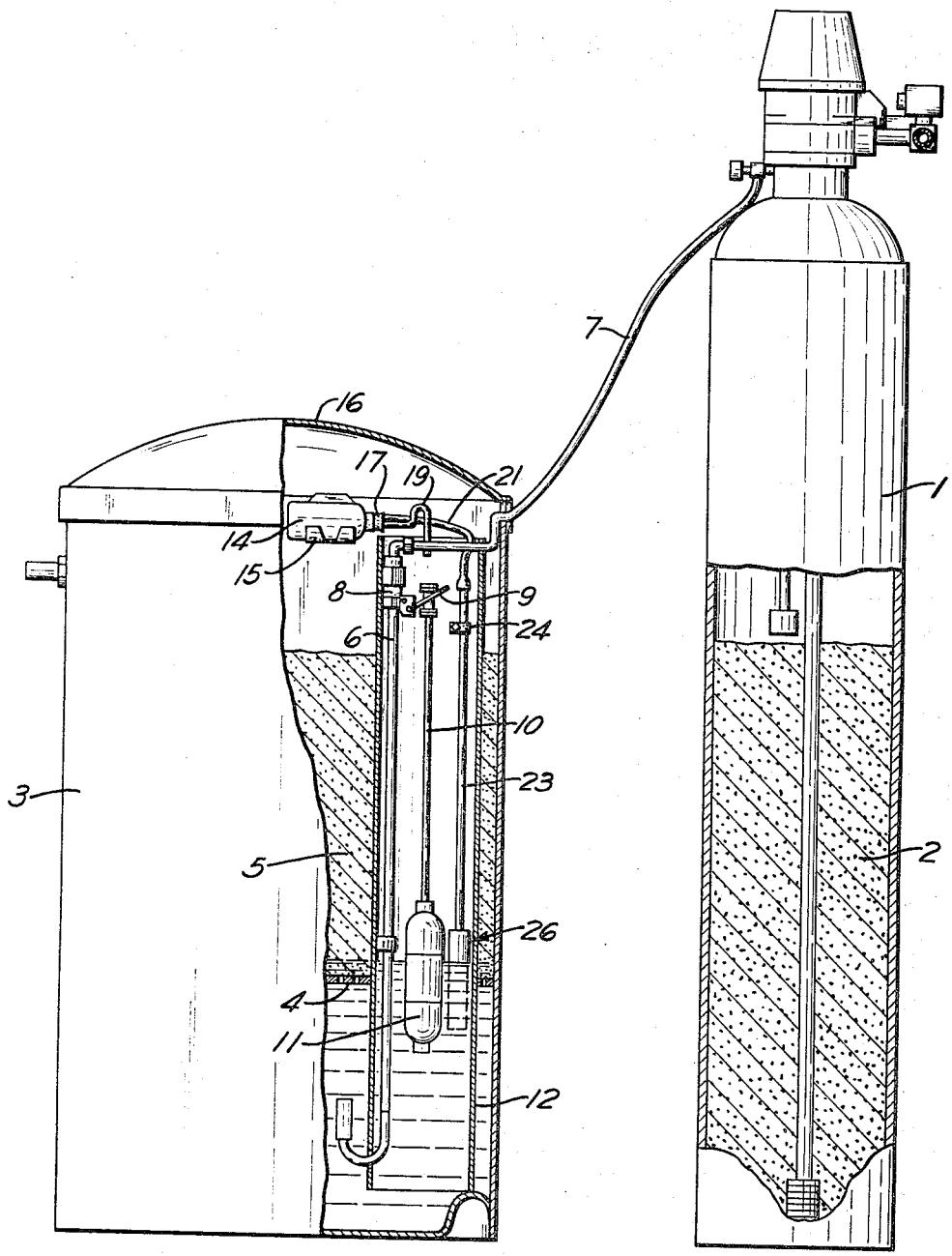

The phenomenon of ion exchange is made use of in apparatus for treating water, such as to deionize it or soften it. The ion-exchange bed has to be regenerated at intervals and at that time it often requires cleaning or sterilizing. For example, in the practice of water softening by the use of artificial or natural zeolites, ion-exchange resins, and the like it often is desirable to remove an accumulation of insoluble iron compounds and/or waterborne dirt on and in the active material of the bed by the application of a solvent-dispersant in liquid solution. This agent commonly is added to the regenerant brine used for restoring the activity of the exhausted resin bed. A very small amount of the iron solvent is required in proportion to the volume of brine needed for a single regeneration treatment. In the case of the usual household water softener, four gallons of brine might be used each time the bed is regenerated, while only about two fluid ounces of solvent-dispersant solution would be mixed with the brine to clean a fouled bed of resin or zeolite. When an iron-bearing water is the continuous water supply for a softener, it is good practice to add such an agent every time the bed is regenerated. Although this can be done by an individual every time the apparatus is put on the regeneration cycle, it is undesirable because the individual may neglect to add the agent. As a consequence, an expensive charge of ion-exchange resin may be permanently ruined and require replacement.

It is among the objects of this invention to provide water treating apparatus in which a solvent-dispersant agent is added to the brine automatically every time the apparatus is put on the regeneration cycle, in which the dispenser for the agent is adjustable so that just the right quantity will be added, in which no additional power is required to operate the dispenser, in which the dispenser is of simple and inexpensive construction, and in which the dispenser can readily be mounted.

In accordance with this invention, there is a brine tank, from which brine is withdrawn periodically for regenerating an ion-exchange bed. After each withdrawal of brine, the brine is replaced in the tank by water, in which salt then dissolves to form brine again. A closed container for a liquid solvent-dispersant agent is mounted in the upper part of the tank. Extending out of the container there is a discharge tube, the inner end of which is located near the bottom of the container and the outer end of which is positioned to discharge into the tank above the brine level. An air tube also extends out of the container, with the inner end of the air tube located above the liquid agent level in the container. The outer end of the air tube is connected to the upper end of a standpipe that is mounted in the tank. Encircling the lower end portion of the standpipe there is a downwardly opening sleeve that extends below the standpipe. The upper end of the sleeve is in sealing engagement with the standpipe and slidingly mounted thereon for vertical adjustment. The lower ends of the sleeve and standpipe are located between the upper and lower levels of the brine in the tank. When water rises around and in the sleeve to replace the brine that was withdrawn from the tank during a regeneration cycle, the water will force a predetermined volume of air up through the standpipe and into the liquid agent container to force some of its contents out through the discharge tube and into the tank, where it will mix with the water and the brine therein. By adjusting the sleeve vertically on the standpipe, the quantity of liquid agent that is dispersed from the container can be regulated.

The preferred embodiment of the invention is illustrated in the accompanying drawings, in which
FIG. 1 is a side view of water treating apparatus, shown partly in section to disclose the dispenser in elevation;
FIG. 2 is an enlarged plan view of the dispenser; and
FIG. 3 is a cross section, partly broken away in section, taken on the line III—III of FIG. 2.

Referring to FIG. 1 of the drawings, a conventional water softener 1, containing a bed 2 of ion-exchange resin, is connected in the usual manner with the water line of the house or building which it is to serve. Water flowing through the bed is softened, during which the bed may be fouled by iron and dirt extracted from the water. The bed is regenerated periodically by brine, which comes from a tank 3 beside the softener. This tank contains a grating or perforated wall 4 that divides the tank into upper and lower chambers. The upper chamber is filled with salt 5 that is supported by the grating. The lower chamber is filled with water that extends a short distance up into the salt so that some of the salt will dissolve and form brine. A pipe 6, having its inlet down in the brine, extends upwardly in the tank and is connected by a conduit 7 with the water softener, which is provided with conventional means for withdrawing brine from the tank in order to regenerate the ion-exchange bed. The pipe is provided with a shutoff valve 8 having a pivoted arm 9 operated by a rod 10 extending upwardly from a float 11 in the brine. While the rod and float are in their upper positions, the valve is closed, but the valve is a type that will be opened when exposed to suction in conduit 7.

To keep the dry salt away from the valve float, the inside of the tank is provided with a brine well in the form of a vertical cylinder 12 that is open at both ends. This rigidly mounted cylinder extends down through grating 4 to a point near the bottom of the tank. After a predetermined quantity of brine has been withdrawn from the tank during the regeneration cycle, water is delivered to the upper end of conduit 7 to replace the withdrawn brine in the tank. The float rises with the water until it shuts valve 8 to stop the incoming water. The apparatus described thus far is conventional and can take many other forms as far as details are concerned.

It is a feature of this invention that a liquid agent for dissolving the iron and other deposits in the resin bed and dispersing them is added to the brine tank periodically. Accordingly, a container is mounted in the tank near the upper part of the well 12. This container may take various forms, but preferably is a bottle 14 and may be the very bottle in which the liquid solvent-dispersant agent is sold. In such a case, the bottle can be supported in the tank by laying it on its side in a plastic bracket 15, which extends above one side of the bottle and has a downturned upper end that can be hooked over the upper edge of the tank beneath its removable cover 16. The screw cap of such a bottle is removed and replaced by a stopper 17 that has a pair of parallel passages 18 (FIG. 3) extending through it. Sealed in each of these passages is a tube. One tube 19 is the one through which liquid is to be discharged from the bottle, and accordingly the inner end of that tube is permanently located near the bottom of the reclining bottle, either by using a bent stiff tube or weighting the end of a flexible tube. The outer end of this discharge tube is positioned to discharge into the well, and for that purpose the tube preferably extends over the top of the well and may even extend a short distance down into it. The portion of the discharge tube between its outer end and the stopper is provided with a permanent reverse bend or goose neck so that it resembles an inverted "U." The loop thus formed extends upwardly at least as high as the top of the bottle to locate it above the liquid level therein even when the bottle is full. This prevents any liquid in the bottle from draining out of the tube accidentally.

The other tube 21 is an air tube, the inner end of which is located above the liquid agent level in the bottle at all times. To ensure this being the case even though the bottle may be turned somewhat in the bracket, it is desirable that the tube be flexible and that a float 22, such as a cork, be mounted on the inner end of the tube. The cork will float on the liquid in the bottle and hold the adjoining open end of the tube above the liquid. The outer end of the air tube is connected to the upper end of a stiff tube that serves as a standpipe 23. This standpipe is fastened to the inside of the brine well by any suitable means that will permit it to be adjusted vertically. For this purpose a spring clip 24 can be screwed or bolted to the side of the well. The lower end of the standpipe must always be located between the minimum and maximum levels of the brine in the well, so the standpipe is adjusted up or down in the clip to the extent necessary to position its lower end at the correct elevation.

Slidably mounted on the lower end portion of the standpipe is a sleeve 26 that has an open lower end. Thhe upper end of the sleeve is in sealing engagement with the standpipe, but can be moved up and down it. For best results, the inside diameter of the sleeve should be considerably larger than the outside diameter of the standpipe in order to form an air chamber of substantial volume. Therefore, the sleeve may be formed from a hollow cylinder 27, in the upper end of which a centrally perforated plug 28 is rigidly mounted. The plug frictionally engages the standpipe extending through it. The plug serves both to seal the upper end of the cylinder and to permit the sleeve to be adjusted up and down on the standpipe. The adjoining portion of the standpipe is calibrated to indicate the amount of liquid agent that will be dispensed from the bottle for any given position of the sleeve along the standpipe. The sleeve always extends below the lower end of the standpipe, so the latter must be high enough to permit the open lower end of the sleeve always to be located above the lower level of the brine in the well, even when the sleeve is in its lowest position on the standpipe.

Of course, all of the parts of the dispenser that has been described should be made of material that will not be affected by brine and the agent that is added to it. Glass or plastic are the most suitable materials for the bottle and tubes.

During regeneration of the water softener, the level of the brine in the brine tank drops below the lower end of sleeve 26, which then fills with air. After the regeneration step, water is turned into the brine tank through conduit 7 and pipe 6 and rises to a previously preset level controlled by the float valve 8. As indicated above, this level will be above the lower ends of the standpipe and sleeve. During this filling cycle, as soon as water starts to rise around and inside the sleeve, air trapped in the chamber formed by the sleeve is forced up through the standpipe until the rising water reaches the lower end of the standpipe. The water continues to rise, however, until it reaches its maximum level, which initial vertical adjustment of the standpipe has made certain will always be above the lower end of that tube in spite of normal variations in the upper level of the water, so that the same amount of air will be displaced every time. The volume of air displaced in this manner, which is equal to the volume of water that has risen in the sleeve to the lower end of the standpipe, plus the insignificant amount of water that enters the standpipe, displaces an approximately equal volume of liquid from the bottle. This liquid, of course, is discharged through tube 19 and into the brine well, where it mixes with the brine in storage and is subsequently flushed through the resin bed during the next regeneration cycle. It there accomplishes its purpose of dissolving accumulated precipitated ferric salts and dispersing them, along with the accumulated dirt, in the used brine which then flows to waste.

It is a common condition in water softening practice that the nature of the water being treated is not constant, but changes from time to time and thus requires more or less cleaning agent to be applied at intervals to the ion-exchange material. For this reason it is important to have a dosing device that is quickly and easily adjustable to suit the changing conditions. This is one of the great advantages of this apparatus, because the dosage of any particular kind of agent can be continuously varied over a given range between predetermined limits, simply by moving the sleeve up or down on the standpipe to change the effective volume of the air chamber formed by the sleeve. Furthermore, the dosage can be changed at any time, quickly and without any special tools or added expense, to suit a changed requirement. The dispensing device can be accommodated to various brine levels by adjusting the standpipe vertically. The device can be quickly added to an existing brine tank or supplied as optional equipment with a new tank. It involves no valves or other moving parts, nor any electric circuits.

According to the provisions of the patent statutes, we have explained the principle of our invention and have illustrated and described what we now consider to represent its best embodiment. However, we desire to have it understood that, within the scope of the appended claims, the invention may be practiced otherwise than as specifically illustrated and described.

We claim:

1. In water treating apparatus in which an ion-exchange bed is regenerated periodically with brine, a brine tank, means for withdrawing brine from the tank for regeneration and then replacing it with water to cause the brine in the tank to periodically fall from an upper level to a lower level and an adjustable dispenser for automatically adding predetermined quantities of a liquid agent to the brine tank, said dispenser comprising a closed container for said agent, means mounting the container in the upper part of the tank, a discharge tube extending laterally out of the container, the inner end of the tube being located near the bottom of the container and the outer end of the tube being positioned to discharge into the tank above the brine level therein, a body of liquid agent in said container varying from a level below the top of the container to a level above the inner end of the discharge tube, the portion of the discharge tube outside of the container being provided with a reverse bend that extends upwardly at least as high as the top of the container, an air tube extending out of the container, the inner end of the air tube being located above the liquid agent level in the container at all times, a vertical standpipe mounted in the tank with its upper end connected to the outer end of said air tube, and a downwardly opening sleeve encircling the lower end portion of the standpipe and extending below it, the upper end of the sleeve being in sealing engagement with the standpipe and slidingly mounted thereon for vertical adjustment, and the lower ends of the sleeve and standpipe being located between the upper and lower levels of the brine in the tank, whereby water rising around and in the sleeve to replace brine withdrawn from the tank will force a predetermined volume of air up through the standpipe and into said container to force some of the liquid agent out of the container through said discharge tube into the tank.

2. In water treating apparatus according to claim 1, said air tube being flexible and extending laterally out of said container, and said dispenser including a float mounted on the inner end of the air tube adapted to float on the liquid agent in the container to hold the open end of the air tube above the agent.

3. In water treating apparatus in which an ion-exchange bed is regenerated periodically with brine, a brine tank provided with a salt chamber and a brine well, means for withdrawing brine from the tank for regeneration and then replacing it with water to cause the brine in the tank to periodically fall from an upper level to a lower level and an adjustable dispenser for automatically adding predetermined quantities of a liquid agent to the brine tank, said dispenser comprising a closed container for said agent provided with a pair of lateral passages, means mounting the container in the upper part of the tank beside the upper end of the well, a discharge tube extending through one of said passages in sealing engagement with its side wall and projecting from both ends of the passage, the inner end of the tube being located near the bottom of the container and the outer end of the tube being located in a position to discharge into the top of said well, the portion of the discharge tube outside of the container having a reverse bend extending upwardly at least as high as the top of the container, an air tube extending through the other of said passages in sealing engagement with its side wall and projecting from both ends of that passage, the inner end of the air tube being located above the liquid agent level in the container, a stiff vertical standpipe in said well with its upper end connected to the outer end of said air tube, means supporting the standpipe for vertical adjustment, and a downwardly opening sleeve encircling the lower end portion of the standpipe and spaced therefrom except at the upper end of the sleeve to form a chamber, the upper end of the sleeve being in sealing engagement with the standpipe and slidingly mounted thereon for vertical adjustment, and the lower ends of the sleeve and standpipe being located between the upper and lower levels of the brine in said well, whereby water rising around and in said chamber to replace brine withdrawn from the tank will force a predetermined volume of air up through the standpipe and into said container to force some of the liquid agent out of the container through said discharge tube into the well.

References Cited

UNITED STATES PATENTS

| 1,728,737 | 9/1929 | Stoner | 4—227 |
| 3,073,674 | 1/1963 | Rudelick | 210—191 X |
| 3,229,854 | 1/1966 | Turnquist. | |
| 3,255,106 | 6/1966 | Reid et al. | 210—191 X |

FOREIGN PATENTS 421,193  12/1934  Great Britain.

REUBEN FRIEDMAN, *Primary Examiner.*

C. DITLOW, *Assistant Examiner.*